United States Patent [19]
Vandever et al.

[11] Patent Number: 5,350,020
[45] Date of Patent: Sep. 27, 1994

[54] MULTI-CROP HARVESTER/WINDROWER IMPLEMENT

[76] Inventors: Billie C. Vandever; Vicki Vandever, Rte. 1, Box 1402, Heyburn, Id. 83336

[21] Appl. No.: 905,621

[22] Filed: Jun. 29, 1992

[51] Int. Cl.⁵ .................. A01D 31/02; A01D 33/10
[52] U.S. Cl. .................................. 171/26; 171/62; 171/40; 171/31; 172/44; 56/257; 56/2
[58] Field of Search .................... 171/26, 62, 40, 31; 172/44; 56/257, 2

[56] References Cited

U.S. PATENT DOCUMENTS

| | | | |
|---|---|---|---|
| 956,385 | 4/1910 | Lovett | 56/257 |
| 1,358,539 | 11/1920 | Goodrum | 56/257 |
| 2,441,244 | 5/1948 | Kimball | 172/44 X |
| 2,629,219 | 2/1953 | Hooley | 56/257 X |
| 2,747,354 | 5/1956 | Bloser | 172/44 |
| 3,399,520 | 9/1968 | Porter | 171/62 X |
| 5,050,373 | 9/1991 | Asatsuma | 56/257 X |

FOREIGN PATENT DOCUMENTS

| | | | |
|---|---|---|---|
| 527415 | 7/1956 | Canada | 56/2 |
| 426768 | 10/1948 | Italy | 56/2 |

Primary Examiner—Randolph A. Reese
Assistant Examiner—Christopher J. Novosad
Attorney, Agent, or Firm—Trask, Britt & Rossa

[57] ABSTRACT

A multi-crop harvester/windrower farm implement may be pushed before a tractor or harvester, to harvest and/or windrow a crop. The implement includes a frame having a plurality of horizontal arms at ground level, which support and position a crop dissociating structure to uproot or sever the stalks of the crop. The implement may include a crop reel to move the uprooted or severed crop to a draper belt, which deposits the crop in a windrow outward of the tractor wheels. In one embodiment, the crop dissociating structure includes interchangeable rod weeder and sickle attachments, allowing a user to choose between uprooting the crop, or severing the stalks of the crop. A plurality of adjustment structure may be included to adjust the altitude of the crop dissociating structure with respect to the crop, facilitating use of the implement on multiple crops. The rod weeder, crop reel, sickle, and draper belt may be driven to rotate by hydraulic motors attached to the PTO system of the tractor or harvester.

19 Claims, 4 Drawing Sheets

MULTI-CROP HARVESTER/WINDROWER IMPLEMENT

BACKGROUND OF THE INVENTION

1. Field

The instant invention relates to farm implements for cutting a crop and depositing it in a windrow.

2. State of the Art

Several options are available to farmers with respect to cutting and harvesting equipment. Motorized harvesters specific to a small range of crops can be used to uproot or cut the plants, and separate the fruit or grain from the remainder of the plant. The farmer can also use harvesting implements which attach to, or are towed behind a tractor. Each option has advantages and disadvantages.

The advantage to using motorized harvesters is that they are designed specifically for harvesting, so damage to the crop is minimized thereby increasing the yield per acre. Motorized harvesters, however, have very limited utility outside of one short period during the year. In most instances, harvesters are crop specific, and a special harvester is required for each crop the farmer grows. Motorized harvesters thus represent a considerable investment for a piece of equipment which sits idle for all but a few weeks out of each year.

The main advantages to using cutting and harvesting implements are that equipment costs are reduced, and the tractor is available for use year-round. With few exceptions, however, a towed or attached farm implement is fairly crop specific and accomplishes only one purpose. The farmer must use separate implements for each type of crop, and each operation required during harvesting. This may necessitate several passes through the fields to complete the harvest. For example, row crops such as beans are typically cut, placed in windrows to dry, and later harvested to separate the beans from the plant. Separate implements are required for cutting, windrowing, and harvesting the beans. With the possible exception of the windrower, implements used during harvesting of the row crop can seldom be used to harvest crops planted in broadcast fashion.

Because towed and attached implements must attach to a tractor, the assembly is seldom an optimal configuration for any task. For example, a crop cutter towed behind a tractor necessitates that the tractor tires run over a significant portion of the crop before being cut by the implement. This damages the crop and reduces the yield per acre. The width between rows also differs among crops. A tractor with a wheel track width set to fit between the rows of a certain crop will damage crops which are planted in rows of a different width. Similarly, an implement set to cut a row crop may not work satisfactorily in cutting a crop planted in broadcast fashion.

There is a continuing need for farm implements which can be attached to a tractor to accomplish multiple functions, and which can be used on different types of crops.

SUMMARY OF THE INVENTION

The present invention is a farm implement to uproot or sever the stalks of crops, and which can be adapted to deposit the dissociated crops in a windrow. In one embodiment, a rod weeder attachment driven by a hydraulic motor is used to uproot the crop. In another embodiment, a sickle attachment, driven by the same drive means as the rod weeder, is used to sever the stalks of the crop.

The implement, with minor modifications, may be attached to the front or the rear of a tractor, or to the front of a harvester. When attached to a tractor, the preferred mode of attachment is a standard three-point hitch. The implement offers significant advantages over existing cutting and windrowing implements because it can be pushed through a crop before the tractor, rather than pulled behind it. This advantage enables the crop to be uprooted or cut before being run over by the tractor tires.

The need for crop dividers to move the crop aside to provide a passage for the tractor wheels is obviated when the implement is pushed before the tractor. As a result, the crop is handled gentler, resulting in less damage and increased yield. This design also obviates the need to change the tractor wheel track width when moving the implement between crops planted in rows of a different width. The implement can be used on row and broadcast crops without modification.

The implement includes a frame having a plurality of horizontal arms at ground level. These arms mount and properly position a crop dissociating means to either uproot or sever the stalks of a crop. In one embodiment, the frame includes a pair of vertical standards having an attachment for a three-point tractor hitch.

In a rod weeder embodiment of the crop dissociating means, a shaft is rotatingly attached to the horizontal arms, and is rotated by a hydraulic motor driven by the tractor's PTO pump. When moved through a crop, the horizontal arms move under the surface of the soil and position the rotating shaft at the root level of the crop. The rotational motion of the shaft uproots the crop. A pair of adjustable coulters may be used to control the depth of the horizontal arms beneath the soil surface.

The rod weeder may be removed from the implement and a sickle attached to the horizontal arms. The sickle enables a crop to be cut at or above ground level. In this embodiment, skids may be used to maintain the desired altitude of the sickle with respect to the stalks of the crop.

When the implement is adapted to windrow the crop, a rotating reel may be attached to the frame to engage and move the uprooted or severed crop away from the rotating rod or sickle. A plurality of deflecting rods mounted behind the rotating rod may be used to assist in separating the crop from the soil, and to guide the crop into the tines of the reel. A rotating draper belt may be disposed behind the reel to receive the uprooted or severed crop, and deposit it in a windrow outward of the tractor wheels. The draper belt rotational direction may be reversible so an operator can choose which side of the tractor to deposit the windrow. This aspect of the invention allows windrows from adjacent cuttings to be deposited side by side, enabling two windrows to be turned simultaneously during subsequent turnings.

The draper belt, rotating rod, sickle, and reel may be driven by various means. In a preferred arrangement, the PTO pump mounted on tractor drives hydraulic PTO motors connected to the driven components. The components may also be driven by drive wheels in contact with the ground, or in an alternate embodiment, by the tractor's hydraulic system.

The implement is adjustable with respect to aspects of various crops. The altitude of the rod weeder with respect to the crop roots may be adjusted by actuating hydraulic cylinders attached to the coulter axles. Similarly, the sickle altitude may be adjusted with respect to the crop stalks. This aspect of the invention allows the implement to be adjusted to suit the requirements of various crops.

The position of the reel may also be adjusted hydraulically. A hinged portion of the frame provides a pivot point enabling the reel to be pivoted toward and away from the rotating rod or sickle, enabling custom adjustment for various crops. This aspect of the invention also allows for easier changeover between the rod weeder and sickle attachments.

DESCRIPTION OF THE ILLUSTRATED EMBODIMENTS

Figure 1:
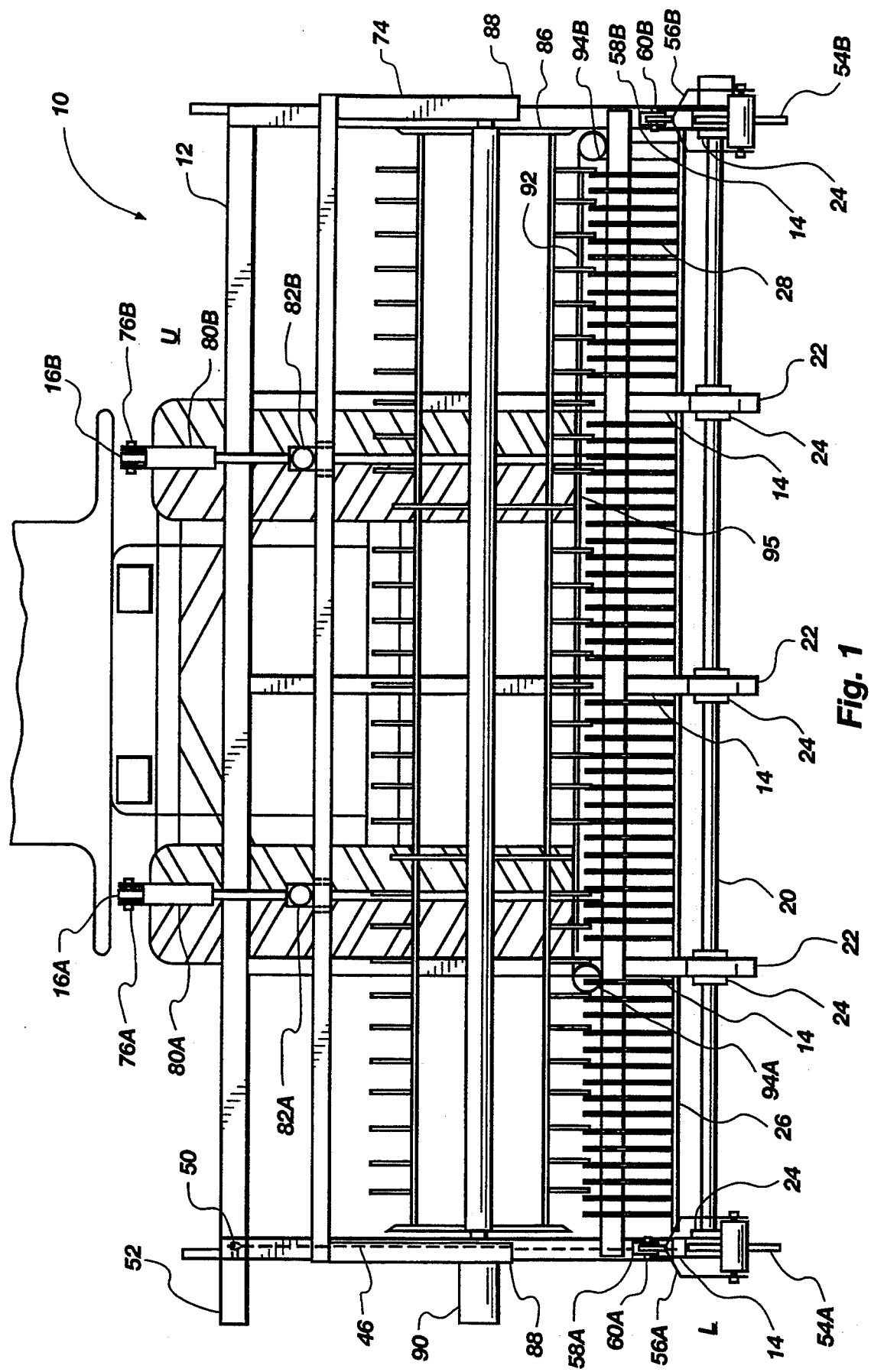
FIG. 1 is a front view of a farm implement of the instant invention having a rod weeder attachment.
Figure 4:
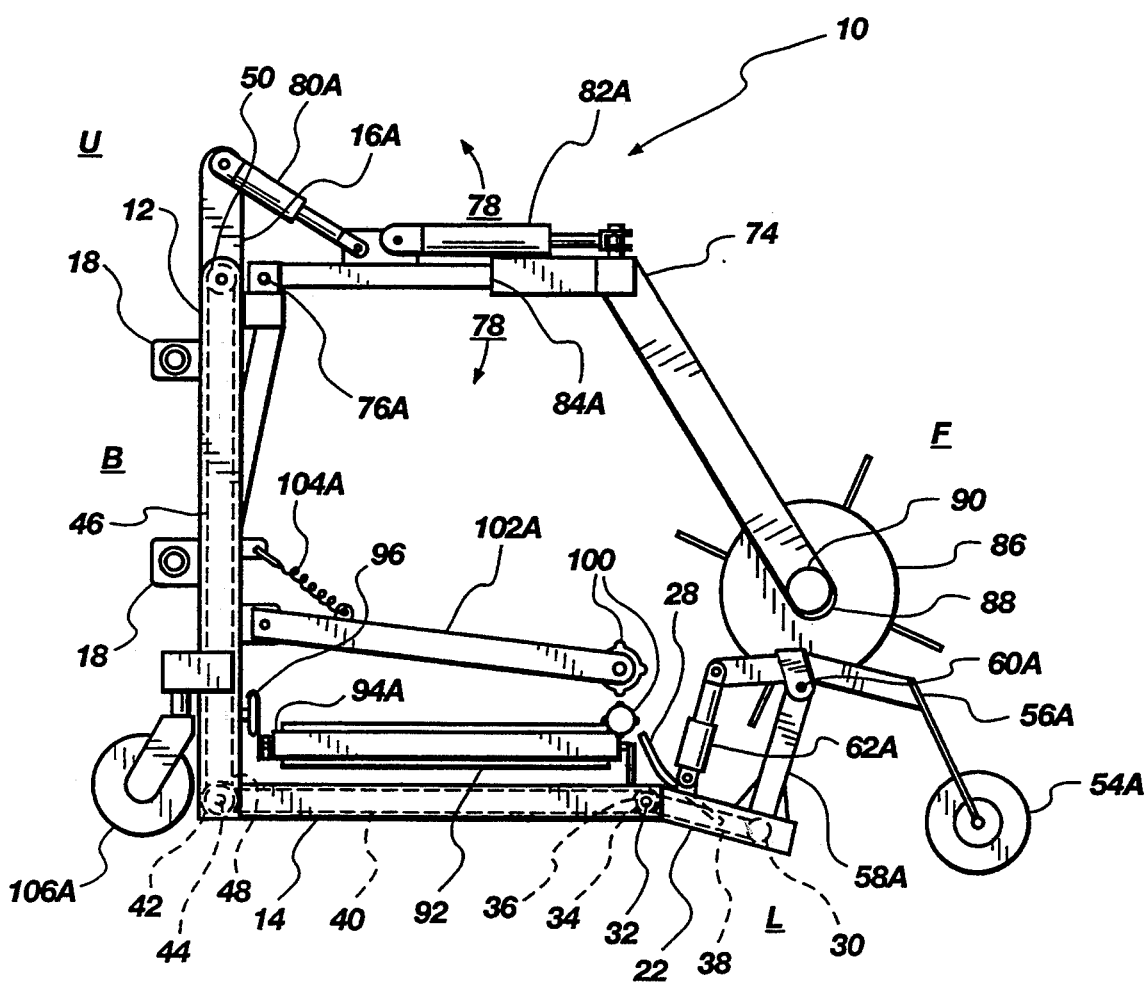
FIG. 4 is a side view of the farm implement.
Figure 5:
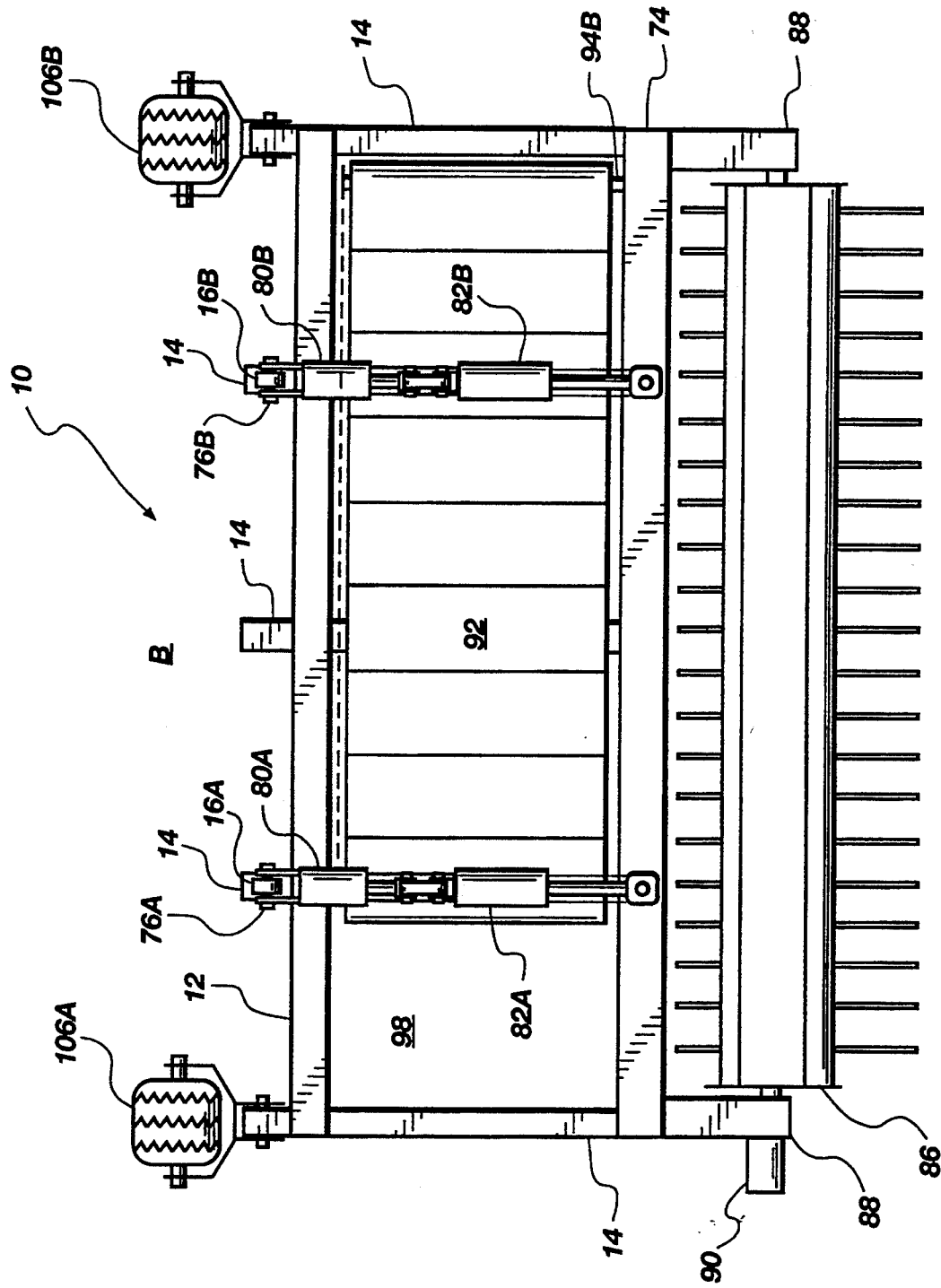
FIG. 5 is a plan view of the implement illustrating the reversible draper belt, and deposit area for the windrow.

Referring to FIGS. 1, 4, and 5, the multi-function farm implement, indicated generally as 10, includes a frame 12 having a plurality of horizontal arms 14 extending from the lower portion L thereof. Horizontal arms 14 are generally parallel to the ground during operation and function to position a crop dissociating means to sever or uproot the crop from the field. A pair of upright standards 16A and 16B are attached to the backside B of frame 12 to enable attachment of a three-point tractor hitch mount 18 to the implement 10. The illustrated embodiment is configured to attach to a three-point hitch; however, the implement 10 may also be attached to the tractor by other means.

The implement 18 includes a detachable crop dissociating means which enables a user to choose the means of removing the crop from the field. In a rod weeder embodiment of the crop dissociating means illustrated in FIGS. 1 and 2, a square shaft 20 is rotatably mounted to a plurality of extensions 22 of the horizontal arms 14 by means of bearing blocks 24 inserted into the extensions. The square shaft 20 extends across the width of the implement. A second shaft 26 is disposed behind the square shaft 20, and bears a plurality of attached deflecting rods 28. Deflecting rods 28 are tilted toward the back B and slightly upward, and function to direct uprooted crops away from the square shaft.

Figure 2:
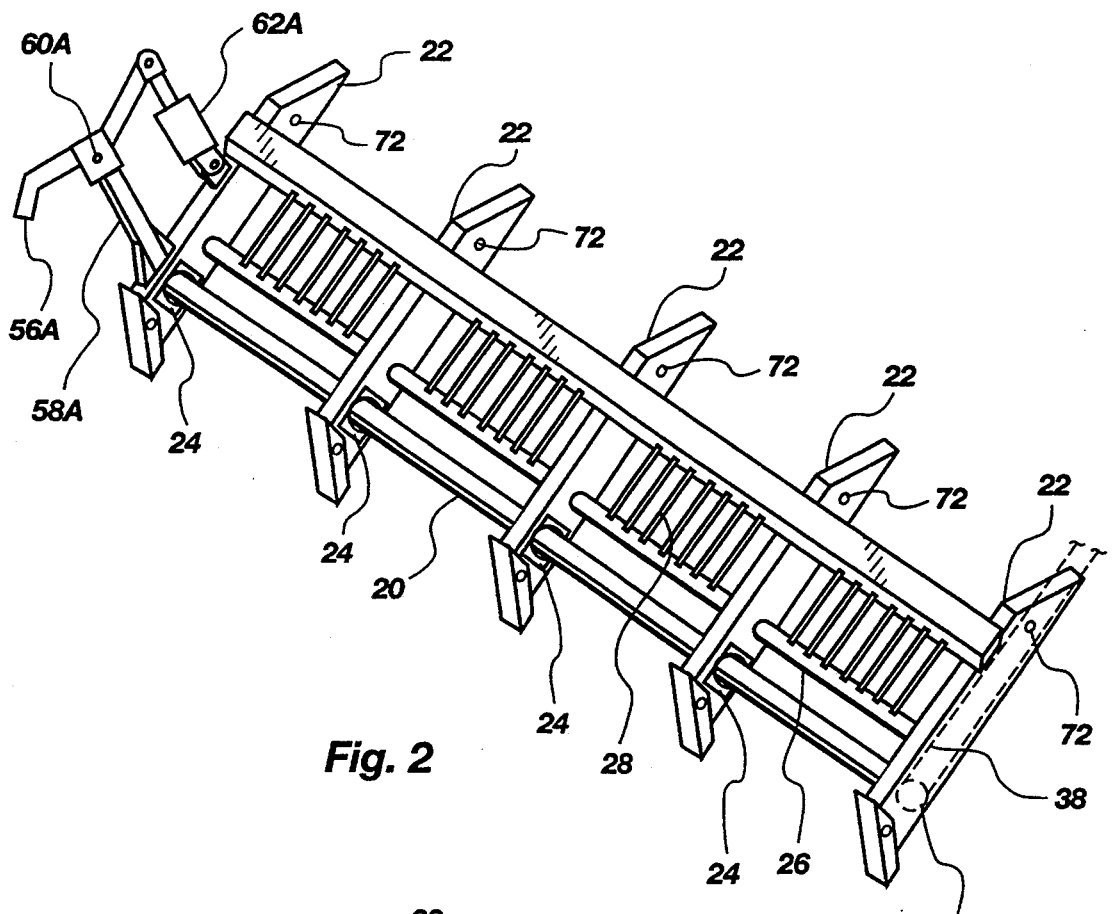
FIG. 2 is a perspective view of the rod weeder attachment for the farm implement of the instant invention.

Referring to FIGS. 2 and 4, a rod weeder drive means includes a secondary sprocket 30 attached to an end of square shaft 20. A jackshaft 32 having first and second jackshaft sprockets 34 and 36 attached thereto is rotatably mounted to one of the horizontal arms 14 by means of bearing blocks. A first endless drive chain 38 is trained about secondary sprocket 30 and first jackshaft sprocket 34. A second endless drive chain 40 is trained about second jackshaft sprocket 36 and a first idler sprocket 42 attached to an idler shaft 44 rotatably attached to frame 12. A third endless drive chain 46 is trained about a second idler sprocket 48 and a drive sprocket 50 attached to the output shaft of first hydraulic motor 52 illustrated in FIG. 1. When first hydraulic motor 52 is connected to a hydraulic line such as commonly associated with a farm tractor, the rotation of the output shaft is communicated to square shaft 20 through the sprocket and chain assembly of the rod weeder drive means. In operation, the horizontal arms 14 and arm extensions 22 move below the ground surface and position the square shaft 20 at the root level of the crop. The rotation of square shaft 20 severs the roots of the crop.

The depth that square shaft 20 moves below the surface may be adjusted by means of a pair of coulters 54A and 54B mounted respectively to a pair of pivoting coulter mounts 56A and 56B. Coulter mounts 56A and 56B are attached respectively to vertical extensions 58A and 58B by pins or bolts 60A and 60B. In turn, the vertical extensions 58A and 58B are mounted to the outside horizontal arm extensions of the rod weeder attachment. A pair of rod weeder hydraulic cylinders 62A and 62B are connected to pivoting coulter mounts 56A and 56B, and the outside horizontal arm extensions 22 enabling hydraulic actuation of the coulter mounts. Extension of the hydraulic cylinder rods pivots the coulter mounts downward which in turn raises the square shaft out of the ground.

The rod weeder attachment may be removed from the implement as the unit illustrated in FIG. 2 consisting of horizontal arm extensions 22, square shaft 20, vertical extensions 58A and 58B, pivoting coulter mounts 56A and 56B, and coulters 54A and 54B. Other crop dissociating means may be attached to the horizontal arms 14 as desired.

Figure 3:
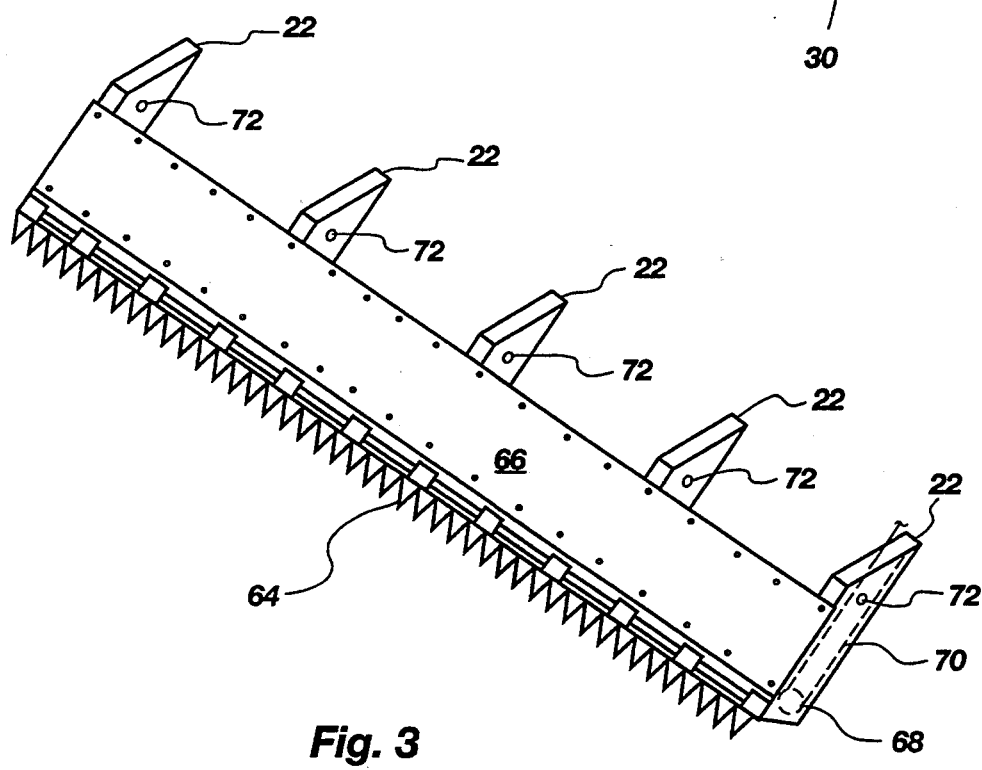
FIG. 3 is a perspective view of the sickle attachment for the farm implement of the instant invention.

In a sickle cutter embodiment of the crop dissociating means, illustrated in FIG. 3, a powered sickle 64, as known in the art having a plurality of chisel teeth 65, is used to sever the stalks of the crop above ground level. The sickle attachment also includes horizontal arm extensions 22 for mounting the attachment to the horizontal arms 14 of the implement. The sickle 64 is maintained at the desired cutting altitude with respect to the stalks of the plants by a pair of adjustable skids (not shown) attached to the front corners of the sickle assembly illustrated in FIG. 3. Other devices such as coulters or wheels may be used to maintain the sickle cutter at the desired altitude. A solid pan 66 is used in place of deflecting rods to direct the severed crop away from the sickle.

The sickle 64 may be driven to operate by the rod weeder drive means, enabling a user to choose which type of cutting is desired, and change back and forth between the two attachments. The sickle cutter attachment also includes a secondary sprocket 68, and a sickle drive chain 70 to enable it to be easily connected to the drive means.

Both attachments may be removed by removing a set of pins 72 which secure the horizontal arm extensions 22 of the attachments to the horizontal arms 14 of the frame. The drive means may be disconnected by removing the first endless chain from the secondary sprockets of the respective attachments.

The farm implement 10 may be adapted to deposit the dissociated crop into a windrow outward of the tractor wheels. In this embodiment, illustrated in FIGS. 1, 4, and 5, a pivoting arm 74 is attached to the upper portion U of the frame 12 at pivot points 76A and 76B. Pivoting arm 74 extends toward the front F of the implement and is pivotable through arcuate path 78. A pair of pivot position hydraulic cylinders 80A and 80B are mounted to upright standards 16A and 16B, and the pivoting arm 74 to urge the arm to travel back and forth through arcuate path 78. A pair of lateral position hydraulic cylinders 82A and 82B are mounted to telescoping portions 84A and 84B of the pivoting arm to provide an additional adjustment.

A common crop reel 86 is rotatably mounted to the distal end 88 of pivoting arm 74. The crop reel 86 functions to move the severed or uprooted crop away from the rod weeder or sickle. The crop reel is driven to rotate by a hydraulic motor 90 attached to an axle of the reel. The crop reel 86 is adjustable by actuating pivot position hydraulic cylinders 80A and 80B, and lateral position hydraulic cylinders 82A and 82B. The hydraulic cylinders enable the implement to be adjusted to accommodate the amount of crop being moved by the reel.

As best illustrated in FIG. 5, a rotating draper belt 92 may be disposed immediately behind reel 86. Draper belt 92 is rotatable around a pair of end rollers 94A and 94B, and is supported along its length by a supporting structure 95 over which the belt rotates. Draper belt 92 is driven to rotate by a draper belt drive means comprised of a hydraulic motor (not shown) drivingly interconnected to at least one of the end rollers. In a preferred arrangement, the hydraulic motor is interconnected to the end rollers 94A and 94B by an endless chain trained about a drive sprocket attached to the hydraulic motor and a pair of driver sprockets attached to the end of each roller. The rotational direction of the draper belt 92 is reversible by reversing the flow of hydraulic fluid flow through the draper belt hydraulic motor. Crops are delivered to the draper belt 92 by reel 86, and are then transported by the belt to one side or the other of the implement.

The draper belt 92 is part of an assembly which is slidable back and forth across the implement by actuating a draper belt hydraulic motor (not shown). The assembly includes a carrier 96, belt support member 95, and end rollers or belt guides 94A and 94B. The assembly is structured to slide back and forth to enable a user to choose which side of the tractor the windrow will be deposited on. As best illustrated in FIG. 5, the draper belt 92 deposits the crop into a windrow through an unobstructed space 98 at the end of the belt. Unobstructed space 98 may be positioned at either end of the belt by moving the belt assembly to one side or the other.

Referring to FIG. 4, a conditioner 100 may be included on the implement if desired. The conditioner 100 is positioned immediately behind the crop reel 86 so as to receive and condition the crop before it is delivered to the draper belt 92. The conditioner is driven by a conditioner hydraulic motor (not shown), and is mounted on pivoting conditioner arms 102A and 102B supported by springs 104A and 104B.

A pair of wheels 106A and 106B are disposed at the backside B of the implement to facilitate easier movement through a field. In operation, the implement essentially floats on its four corners and is not controlled by the tractor. The wheels 106A and 106B support and position the backside, while either the coulters 54A and 54B, or the skid plates (not shown) support and position the front side, depending on the cutting attachment.

Reference herein to details of the illustrated embodiment are considered illustrative and should not be construed to limit the invention defined by the foregoing claims.

What is claimed is:

1. A farm implement having interchangeable crop dissociating attachments for harvesting crops comprising:
    a frame having a plurality of horizontal arms attached thereto each having releasable fastener means for alternately engaging various attachments;
    crop dissociating attachments alternately attachable to said frame for harvesting said crops including,
        a rod weeder attachment for uprooting crops comprising,
            a plurality of horizontal arm extension for removable attachment of said rod weeder attachment to said horizontal arms by engagement of said releasable fastener means,
            a square shaft rotatably attached to said horizontal arm extensions,
            adjustment means for adjusting the altitude of said square shaft with respect to the roots of a crop, and
            means for directing uprooted crops away from said square shaft, and
        a sickle attachment, attachable to said frame when said rod weeder is detached from said frame, for severing the stalks of a crop comprising,
            a plurality of horizontal arm extension for removable attachment of said sickle attachment to said horizontal arms by engagement of said releasable fastener means,
            a sickle blade movably attached to said horizontal arm extensions,
            adjustment means for adjusting the altitude of said sickle blade with respect to the stalks of crop, and
            means for directing severed crops away from said sickle blade,
    attachment drive means attached to said frame for urging said crop dissociating means to dissociate a crop from a field, said attachment drive means being adapted to attach to said rod weeder attachment to urge said square shaft to rotate, and to said sickle attachment to urge said sickle blade to move.

2. The farm implement of claim 1 wherein said attachment drive means includes a hydraulic motor for attachment to a hydraulic pump, and having an output shaft in driving engagement with said crop dissociating means.

3. The farm implement in claim 1 wherein said attachment drive means includes a drive wheel for engagement with the ground, and having an output shaft in driving engagement with said crop dissociating means.

4. The farm implement in claim 1 wherein said attachment drive means includes a drive shaft for attachment to the power take-off shaft of a farm vehicle.

5. A farm implement for attachment to a tractor and structured to uproot crops comprising:
    a frame having a plurality of horizontal arms attached thereto having releasable fastener means adapted to receive and engage various removably attached crop dissociating structures;
    hitch means attached to said frame for attachment of said implement to said tractor;
    a unitary crop dissociating structure for dissociating a crop from a field having a plurality of horizontal arm extensions structured to be detachably attached to said horizontal arms by interconnection with said releasable fastener means;
    means attached to said frame for directing said dissociated crop away from said dissociating means;

drive means attached to said frame for urging said crop dissociating means to move;

connecting means for connecting said drive means to said crop dissociating means; and means attached to said frame for adjusting the altitude of said crop dissociating means relative to a crop.

6. The farm implement in claim 5 including a plurality of chisel teeth attached to and extending laterally between said horizontal arms and positioned to shear said crops.

7. The farm implement in claim 5 wherein said drive means is a hydraulic motor for attachment to a hydraulic pump.

8. The farm implement in claim 5 wherein said drive means is a drive wheel for engagement with the ground.

9. The farm implement in claim 5 wherein said drive means is a drive shaft connected to the power take-off shaft of said tractor.

10. The farm implement in claim 5 wherein said crop dissociating means is a rod weeder attachment for uprooting crops comprising:

said plurality of horizontal arm extensions for removable attachment of said rod weeder attachment to said horizontal arms;

a square shaft rotatably attached to said horizontal arm extensions; and means for directing uprooted crops away from said square shaft.

11. The farm implement in claim 5 wherein said crop dissociating means is a sickle attachment for severing the stalks of a crop comprising:

a plurality of horizontal arm extensions for removable attachment of said sickle attachment to said horizontal arms;

a sickle blade movably attached to said horizontal arm extensions; and means for directing severed crops away from said sickle blade.

12. A farm implement for harvesting and windrowing a crop comprising:

a frame having a plurality of horizontal arms extending therefrom and a hitch for mounting said implement to a tractor said frame being adapted to alternately receive various crop dissociating means;

crop dissociating means detachably attached to said horizontal arms for dissociating said crop from a field;

a draper belt horizontally disposed in said frame for moving said dissociated crop laterally with respect to said dissociating means, said raper belt comprising an endless belt rotatable around end rollers;

draper belt drive means attached to said frame and drivingly interconnected to at least one of said end rollers for urging said draper belt to rotate around said end rollers;

a reel rotatingly attached to said frame having a plurality of rode protruding therefrom, said rods for engaging said dissociated crop and transferring it to said draper belt;

reel drive means attached to said reel and said frame for urging said reel to rotate around a reel rotational axis;

first adjusting means attached to said frame for adjusting the altitude of said crop dissociating means with respect to said crop; and second adjusting means attached to said frame for pivotally adjusting the altitude of said reel with respect to said crop dissociating means.

13. The farm implement in claim 12 wherein said crop dissociating means includes:

a shaft rotatingly attached to horizontal arm extensions secured to said horizontal arms for uprooting said crop;

means attached to said frame for directing said uprooted crop away from said shaft;

shaft drive means for urging rotating shaft to rotate; and connecting means for connecting said shaft drive means to said shaft.

14. The farm implement in claim 12 wherein said crop dissociating means includes:

a sickle attached to horizontal arm extensions detachably attached to said horizontal arms for severing the stalks of said crop;

means attached to said frame for directing said severed crop away from said sickle;

sickle drive means for urging said sickle to sever the stalks of said crop; and structure attached to said frame for gauging the altitude of said sickle with respect to the stalks of said crop.

15. The farm implement in claim 12 wherein independently rotatable wheel are attached to said frame to facilitate moving said implement through a field.

16. A push-type multi-crop combination cutter and windrower farm implement comprising:

a frame having at least three parallel, spaced apart horizontal arms each having releasable fastener means adapted to receive interchangeable crop dissociating means removably attached thereto;

a hitch attached to said frame for mounting said implement to a tractor;

crop dissociating means having a plurality of horizontal arm extensions corresponding in number to said horizontal arms of said frame and structured to detachably attach to said horizontal arms by interconnection with said releasable fastener means for pushing through a crop to dissociate the crop from the field;

a draper belt horizontally disposed in said frame for moving said dissociated crop laterally with respect to said dissociating means, and depositing said crop into a windrow outward of the wheels of said tractor, said draper belt comprising an endless belt rotatable around end rollers;

draper belt drive means attached to said frame and drivingly interconnected to at least one of said end rollers for urging said draper belt to rotate around said end rollers;

a reel rotatingly attached to said frame having a plurality of rods protruding therefrom, said rods for engaging said dissociated crop and transferring it to said draper belt;

reel drive means attached to said reel and said frame for urging said reel to rotate around a reel rotational axis;

first adjusting means attached to said frame for adjusting the altitude of said crop dissociating means with respect to said crop; and second adjusting means attached to said frame for rotatably adjusting the altitude of said reel with respect to said crop dissociating means.

17. The farm implement in claim 16 wherein said corp dissociating means includes:
- a shaft rotatingly attached to horizontal arm extensions detachably secured to said horizontal arms for uprooting said crop;
- means attached to said frame for directing said uprooted crop away from said shaft;
- shaft drive means for urging said rotating shaft to rotate; and
- connecting means for connecting said shaft drive means to said shaft.

18. The farm implement in claim 16 wherein said crop dissociating means includes:
- a sickle attached to horizontal arm extensions detachably secured by engagement of said releasable fastener means to said horizontal arms for severing the stalks of said crop;
- means attached to said frame for directing said severed crop away from said sickle;
- sickle drive means for urging said sickle to sever the stalks of said crop, said sickle drive means being releasably attached to said sickle to facilitate release of said sickle from said frame; and
- structure attached to said frame for gauging the altitude of said sickle with respect to the stalks of said crop.

19. The farm implement in claim 16 wherein said frame includes right and left front corners positioned proximate the ground and right and left back corners positioned proximate the ground, and further including independently rotatable wheels attached to said right and left back corners of said frame to independently support said rear corners of said frame to facilitate moving said implement through a field.

* * * * *

UNITED STATES PATENT AND TRADEMARK OFFICE
CERTIFICATE OF CORRECTION

PATENT NO. : 5,350,020

DATED : September 27, 1994

INVENTOR(S) : Vandever et al.

It is certified that error appears in the above-indentified patent and that said Letters Patent is hereby corrected as shown below:

In Column 6, line 11, change "extension" to --extensions--;

In Column 6, line 25, change "extension" to --extensions--;

In Column 6, line 34, before "crop," insert --a--;

In Column 8, line 28, after "rotatable" change "wheel" to--wheels--;

In Column 9, line 1, change "corp" to --crop--.

Signed and Sealed this

Twentieth Day of December, 1994

Attest:

BRUCE LEHMAN

Attesting Officer     Commissioner of Patents and Trademarks